(12) United States Patent
Haimer (10) Patent No.: US 8,286,972 B2
(45) Date of Patent: Oct. 16, 2012

(54) LOW-VIBRATION TOOL HOLDER (75) Inventor: Franz Haimer, Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 1157 days.

(21) Appl. No.: 12/066,376

(22) PCT Filed: Sep. 11, 2006

(86) PCT No.: PCT/EP2006/008833
§ 371 (c)(1),
(2), (4) Date: Jun. 16, 2008

(87) PCT Pub. No.: WO2007/031256
PCT Pub. Date: Mar. 22, 2007

(65) Prior Publication Data
US 2008/0290613 A1    Nov. 27, 2008

(30) Foreign Application Priority Data
Sep. 13, 2005   (DE) .................... 10 2005 043 626

(51) Int. Cl.
*B23B 31/117*    (2006.01)
(52) U.S. Cl. ........... 279/102; 409/141; 29/447; 408/143
(58) Field of Classification Search .................. 279/102, 279/103; 408/143; 409/141; 29/447; *B23B 31/117*
See application file for complete search history.

(56) References Cited

U.S. PATENT DOCUMENTS

| | | | |
|---|---|---|---|
| 4,557,642 A * | 12/1985 | Dudas et al. .............. | 408/239 R |
| 6,315,506 B1 * | 11/2001 | Mizoguchi .................... | 409/234 |
| 6,394,466 B1 * | 5/2002 | Matsumoto et al. .......... | 279/103 |
| 7,137,185 B2 * | 11/2006 | Voss et al. ....................... | 29/447 |
| 2003/0170084 A1 * | 9/2003 | Bergholt et al. .............. | 408/143 |

FOREIGN PATENT DOCUMENTS

| | | |
|---|---|---|
| DE | 10 2004 019 869 A1 | 8/2005 |
| DE | 10 2004 054 550 A1 | 5/2006 |
| JP | 2002301633 A * | 10/2002 |
| WO | WO 2005/068118 A1 | 7/2005 |
| WO | WO 2006/050952 A1 | 5/2006 |

* cited by examiner

*Primary Examiner* — Eric A Gates
*Assistant Examiner* — Bayan Salone
(74) *Attorney, Agent, or Firm* — Holland & Hart LLP (57) ABSTRACT

The present invention relates to a low-vibration tool holder (1) with a tool holder base body (2, 3, 4, 6) and a tensioning arrangement (5) which provides axial tensioning of the tool holder base body (2, 3, 4, 6) and which is simultaneously tensioned in a radially flexible way with respect to the tool holder base body (2, 3, 4, 6). This tool holder (1) is less susceptible to vibration than previously known tool holders, which ensures better true running even during operation and in particular when heat-induced expansion of materials occurs, since the clamping arrangement (5) which is integrated in the tool holder (1) is continuously centered with respect to the tool holder base body (2, 3, 4, 6). Furthermore, such a tool holder (1), in particular within a modular design, can be adapted very flexibly to different types of tools and workpiece machining processes.

18 Claims, 15 Drawing Sheets

LOW-VIBRATION TOOL HOLDER

The present invention concerns a tool holder for tools, particularly for piping, turning, milling, reaming and grinding tools in accordance with the generic term of claim 1. Such tool holders come in all variations. For example, with expansion chucks, tensioning drums or shrink fit chucks for tools with preferably cylindrical shafts, with tool holders also being known that do not receive the tool shaft centrally axially, but are, for example, screwed to the side of it.

Due to the rotation of such tool holders about their longitudinal axis and/or the action which, for example, the rotating workpiece to be machined with the tool, exerts on the tool and thus on the tool holder and the like, the tool holder can be excited into vibration, for example, precession about its ideal rotation axis or/and transversal vibration in a plane containing the rotation axis, with a mixture of such vibrations also being conceivable. These vibrations counteract high precision, and thus accuracy and reproducibility in the machining of workpieces.

In DE 10 2004 019869 A1, from which the present invention proceeds and whose contents are included in full into the description, as a result of which particular characteristics and embodiments of tool holders of this prior art are included in this description, it was proposed for the purpose of vibration-damping such tool holders that a tensioning arrangement be arranged at the tool holder to exercise an axial tensioning force on the tool holder via an axial tensioning section. The axial tensioning introduced into the tool holder by the tensioning arrangement changes the spring properties of the tool holder, especially its spring rate in the tensioned axial section and thus of the tool holder overall relative to a mechanically untensioned state, as a result of which, given a suitable setting of the spring properties of the tool holder, excitable vibration properties and their associated resonance frequencies of the tool holder can be selectively altered.

Although significant vibration damping of the tool holder can be achieved by this measure, such an embodiment can have drawbacks in certain circumstances. When the material used for the tensioning arrangement has a lower thermal expansion than the material of the rest of the tool holder, there is a risk that, in the event of thermal expansion, for example due to workpiece machining or thermal clamping or unclamping of a tool shaft, the tensioning force and thus the vibration damping changes, the centring of the tensioning arrangement with respect to the tool holder changes, or the material of the tensioning arrangement is even damaged. The result may in turn be vibration and geometry-related true-running problems with the tool holder that can decrease the precision of workpiece machining. The object of the present invention is therefore to provide a low-vibration tool holder that is less, or not at all, susceptible to the aforementioned problems, with the tool holder being particularly easy to make.

This object is achieved with a tool holder in accordance with claim 1, having advantageous embodiments that are the subject of the dependent claims.

The present invention is characterised in that the tool holder is provided with a tensioning arrangement which, in addition to a tensioning force component acting in an axial direction, has a radial tensioning force component through which the tensioning arrangement is radially tensioned with respect to the tool holder base body, wherein, by virtue of the fact that, the tensioning arrangement has on at least one side with respect to the tool holder longitudinal axis one or more bearing surface sections in contact with one or more mating surface sections of the tool holder, the tensioning arrangement can respond flexibly, for example, to thermal material expansion, by sliding of the bearing surface sections to the mating surface sections. In this way, play between the tensioning arrangement and the tool holder base body is prevented that would decrease the axial tensioning of the tool holder and lead to true-running problems, as such play would no longer guarantee centring of the tensioning arrangement with respect to the tool holder base body. In addition, this flexible tensioning of the tensioning arrangement with respect to the tool holder base body effectively prevents damage to the experimental assembly or the tool holder base body.

In a preferred embodiment, the tensioning arrangement in relation to the tool holder longitudinal axis is tensioned radially on both sides with respect to the tool holder base body. This improves the effectiveness of the radial tensioning with regard to its flexible response. Advantageously, the tool holder base body essentially consists of a tool steel and the tensioning arrangement of a ceramic, a heavy metal or a hard metal or a composite material, since that keeps the tensioning arrangement much more rigid than the tool steel, and thus the spring properties of the tool holder can be greatly influenced. Since, with such a material choice, the tensioning arrangement has a lower coefficient of thermal expansion than the tool holder base body, it is advantageous if the tensioning arrangement is tensioned radially inwardly with respect to the tool holder base body, i.e. the tensioning force component introduced radially by the tensioning arrangement in the tool holder base body acts outwardly, or, in other words, the tensioning arrangement is arranged at least partially closer to the tool holder longitudinal axis than the tool holder base body and these exterior areas of the tool holder base body force the tensioning arrangement towards the tool holder longitudinal axis.

In a particularly preferred embodiment, the tool holder is modularly designed such that the tensioning arrangement can be removed without destruction. In this way, the tensioning arrangement can be replaced simply at any time, and so, for example, when the tool is changed, any altered vibration behaviour on the part of the tool holder can be taken into account. The modular design of the tool holder is achieved preferably by making the chuck detachable from the middle section and coupling shaft of the tool holder, with especially a screw connection being provided here. For even greater variability and adaptability of the tool holder to different tools, it is advantageous if the chuck head is arranged at or in the tool receptacle, and in addition, is detachable from the chuck, particularly by unscrewing.

In a preferred embodiment, the bearing surface section of the tensioning arrangement is in the form of a conical annular surface, and the tensioning arrangement axially engages the tool holder base body, at least in part. In an alternative embodiment, the bearing surface section is in the shape of a hemispherical annular groove, with the mating surface section formed by a hemispherical annular projection or is provided by individual balls arranged in the tool holder base body. In a further alternative embodiment, the mating surface section may be provided by a centring ring, which, for its part, braces itself against the tool holder base body. Such a centring ring enables both the radial and axial tensioning to be set very sensitively. For example, the centring ring can have a circular cross-section that acts against a bearing surface section in the shape of a hemispherical annular groove.

Such a conical shape could be provided by a centring ring, for example, such that the centring ring has a diamond-shaped cross-section and the tensioning arrangement comprises two conically opposing annular bearing areas. This conically opposing bearing area design guides the tensioning arrangement at both bearing areas, thereby increasing the centring accuracy even further. However, centring rings are also possible that provide only one, for example, conical mating surface.

Advantageously there is between the tensioning arrangement and the tool holder base body at least one flat seat, which is formed orthogonally, relative to the longitudinal axis of the tool holder, by flat abutting surfaces of the tensioning arrangement and the tool holder base body. Through this design, the maximum possible axial tensioning forces can be transferred to the tool holder base body by the tensioning arrangement. To simplify the design, it may however also be provided for both the axial and the radial tensioning force components to be provided via conical annular surfaces.

Particularly advantageous, especially in the case of a tensioning arrangement lying radially outward relative to the tool holder base body, there is play at least between two opposing surfaces of tensioning arrangement and tool holder base body, with the surface areas in which the tensioning arrangement are axially or radially tensioned against the tool holder base body, being excluded from said play. By means of this play, it is especially simple to compensate for thermally induced expansion, such that there is no risk of material damage or destruction.

To additionally positively affect the vibration behaviour of the tool holder and thus to render the tool holder less susceptible to vibration, between the tensioning arrangement and tool holder base body are preferably arranged one or more damping elements, which damp axial and/or radial vibration of the tool holder or the tool holder base body with respect to the tensioning arrangement and vice versa.

Further advantages, characteristics and features of the present invention become clear from the following description in connection with the figures. These show in FIG. 1 a longitudinal section of a tool holder in a first preferred embodiment, FIG. 2 a longitudinal section of the tool holder from FIG. 1 in an exploded illustration, FIG. 3 a longitudinal section of a tool holder in a second preferred embodiment, FIG. 4 a longitudinal section of a tool holder in a third preferred embodiment, FIG. 5 a longitudinal section of a tool holder in a fourth preferred embodiment, FIG. 6 a longitudinal section of a tool holder in a fifth preferred embodiment, FIG. 7 a longitudinal section of a tool holder in a sixth preferred embodiment, FIG. 8 a longitudinal section of a tool holder in a seventh preferred embodiment, FIG. 9 a longitudinal section of a tool holder in a eighth preferred embodiment, FIG. 10 a longitudinal section of a tool holder in a ninth preferred embodiment with an inserted tool, FIG. 11 a longitudinal section of a tool holder in a tenth preferred embodiment with an inserted tool, FIG. 12 a longitudinal section of a tool holder in an eleventh preferred embodiment with an inserted tool, FIG. 13 a longitudinal section of a tool holder in a twelfth preferred embodiment, FIG. 14 a longitudinal section of a tool holder in a thirteenth preferred embodiment with an inserted tool, FIG. 15 a longitudinal section of a tool holder in a fourteenth preferred embodiment with an inserted tool.

Figure 1:
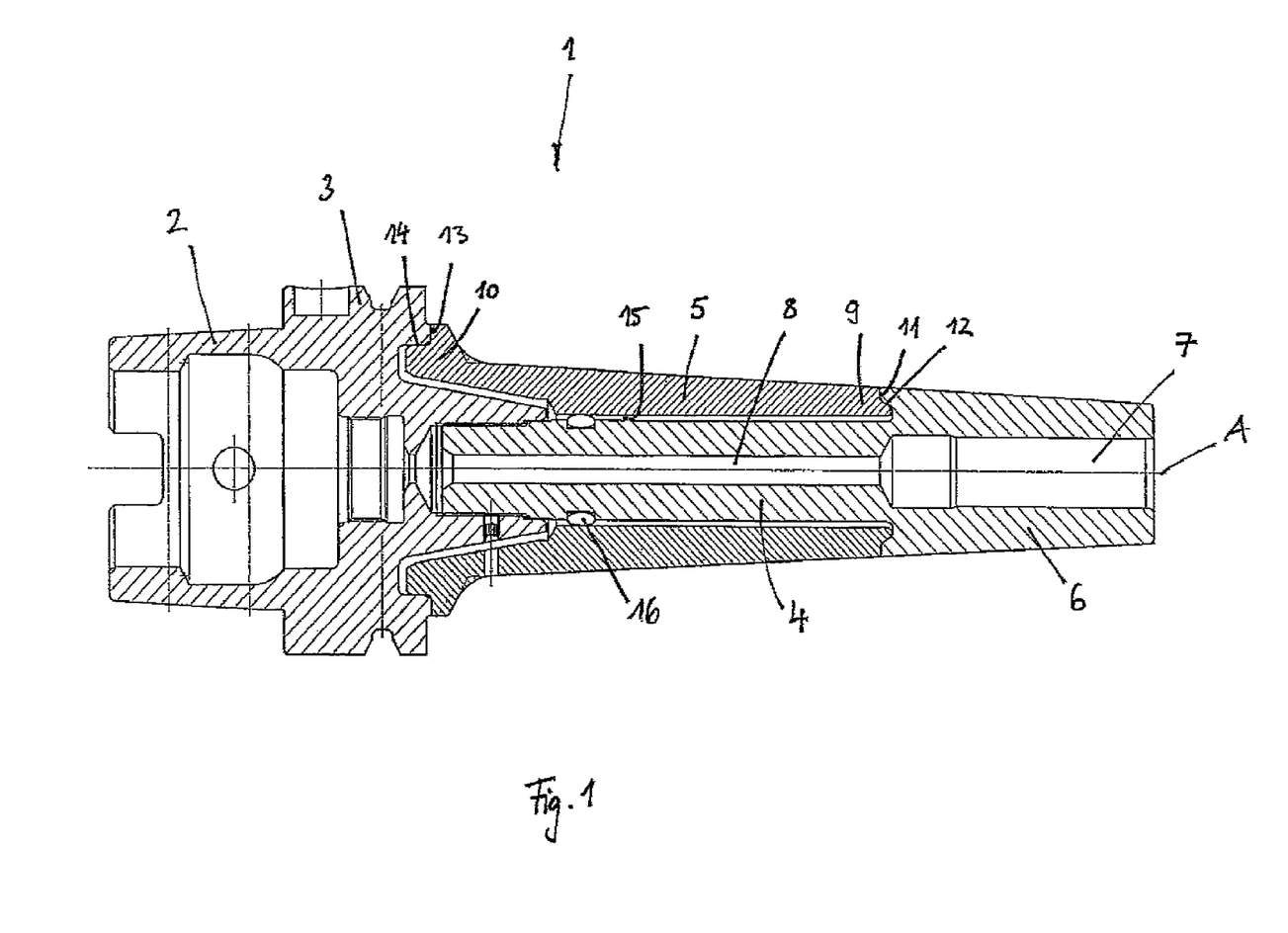

FIG. 1 is a longitudinal section of a first preferred embodiment of the present invention. The tool holder 1 comprises a coupling shaft in the form of a hollow shaft coupling 2, a middle section 3 and a chuck 4, which form the tool holder base body, and a tensioning arrangement 5. The chuck 4 consists of a chuck head 6, in which is arranged a tool receptacle 7, for shrink fitting a cylindrical tool shaft, and has a coolant channel 8. The essentially rotationally symmetrical tensioning arrangement 5 has two ends 9, 10, with the front end 9 engaging axially with the chuck 4 in the region of the chuck head 6 and the rear end 10 engaging axially with the middle section 3. At these two points of engagement are formed seats 11, 12, 13, 14, at which bearing surfaces of the tensioning arrangement 5 make contact with mating surfaces of the middle section 3 or the chuck head 6. For one thing, two flat seats 11, 13 are formed, which for the most part provide the axial tensioning of the tensioning arrangement 5 under pressure between the middle section 3 and the chuck head 6. These flat seats 11, 13 comprise the largest possible areas in order that the tool holder 1 may have a high degree of stability, especially tilting stability, and rigidity. In the example of FIG. 1, the seat 12 is formed by two conical annular surfaces so as to produce radial tensioning of the tensioning arrangement 5, with the tensioning arrangement 5 being tensioned or forced radially inwards with respect to the chuck head 6. In the example of FIG. 1, the seat 14 is cylindrical relative to the tool holder longitudinal axis A, more precisely it is designed for no play or as a press fit, as a result of which, too, the tensioning arrangement 5 is centred.

The radial tensioning of the tensioning arrangement 5 with respect to the chuck head 6 causes automatic centring, which is also preserved in the case of thermal expansion. In the present case of FIG. 1, the tensioning arrangement 5 is made of a vibration-damping material, preferably hard metal, heavy metal or ceramic and has a lower coefficient of expansion with respect to the tool holder base body, that is, coupling shaft 2, the middle section 3 and chuck 4. On thermal expansion of the chuck 4, the axial tensioning between the two flat seats 11, 13 is partially released, to be sure, but the tensioning arrangement 5 slides over the seat 12, but remains centred because of its radial tensioning. After the tool holder 1 cools, tool holder base body and tensioning arrangement 5 each contract to their starting dimensions, with the conical seat 12 again facilitating sliding of the surfaces towards each other while centring is retained.

To compensate for greater radial thermal expansion of the tool holder base body with respect to the tensioning arrangement 5, an axial annular gap 15 is provided between the tool holder base body and the tensioning arrangement 5. In this annular gap 15 is additionally provided a ring-shaped damping element 16, which damps radial vibration between the chuck 4 and the tensioning arrangement 5.

The strength of the axial and radial tensioning between tensioning arrangement 5 and tool holder base body is set via approach of the chuck 4 towards the middle section 3, as is described below in connection with FIG. 2. In it is shown the tool holder from 1 FIG. 1 in an exploded view. It may be seen that the tool holder 1 has a modular structure, more precisely consisting of a first part 17, which comprises the coupling shaft 2 and the middle section 3, a second section 18, which comprises the chuck 4 with the chuck head 6, the tensioning arrangement 5 and the damping element 16. For detachable joining of these parts to the tool holder 1, the first part 17 has an internal thread 19 and the second part 18 has a matching external thread 20. After arrangement of the damping element 16 in a designated annular groove 21 on the second part 18, the tensioning element 5 is pushed concentrically onto the second part 18 and the second part 18 is screwed to the first part 17. This screw connection immobilises the tensioning arrangement 5 between the middle section 3 and the chuck head 6, with, to an extent depending on the depth to which the second part 18 has been screwed into the first part 17 via the flat seats 11, 13 and the conical seat 12, a certain axial and radial tensioning of tensioning element 5 occurring with respect to the tool holder base body. To maintain this level of tensioning, particularly during operation of the tool holder 1, a locating screw 21 is provided, which engages with a corresponding internal thread 22 of the first part 17, and makes contact with the second part 18 and immobilises it against rotation with respect to the first part 17.

Figure 2:
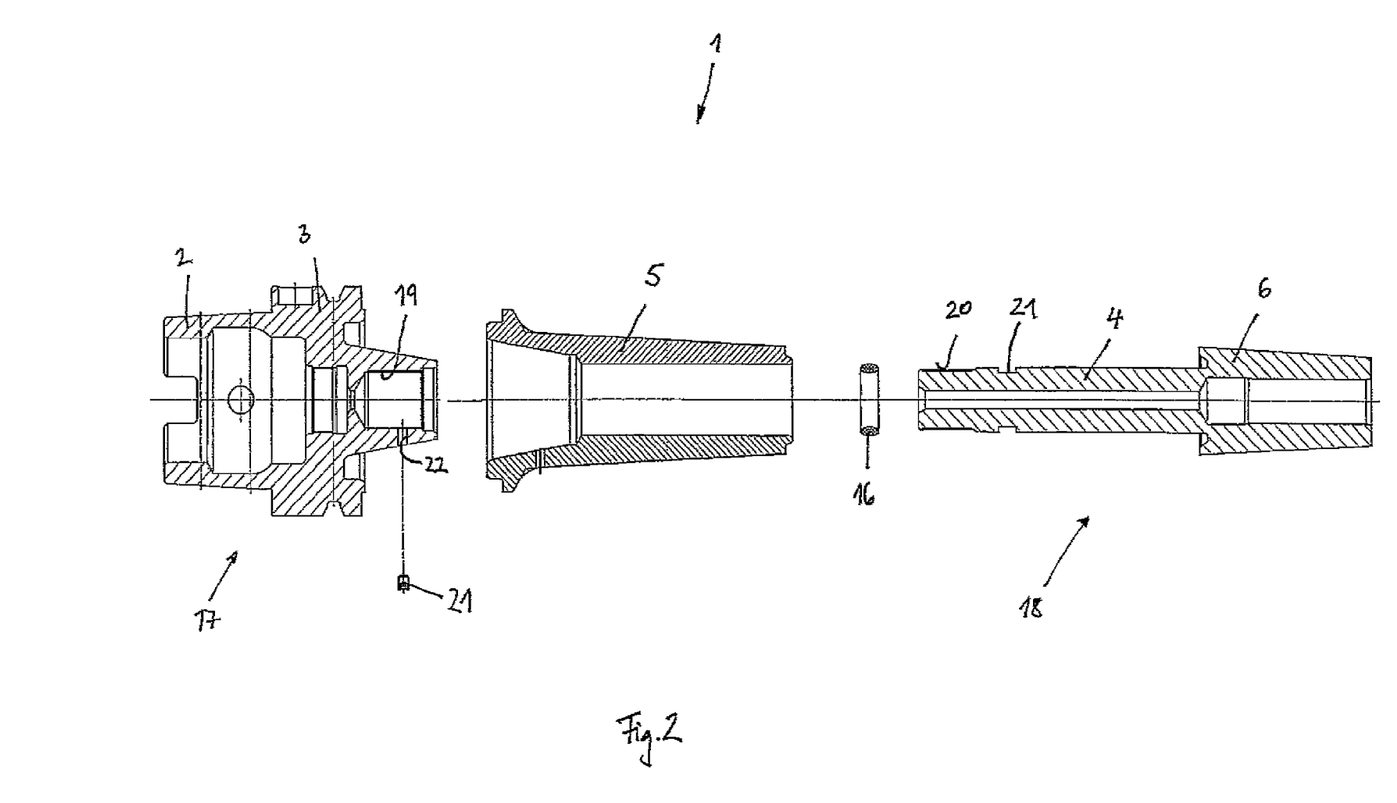

In contrast to the tool holder 1 shown in FIG. 1 and FIG. 2, the seat 12 could also be provided as an axially cylindrical seat design and the seat 14 as a conical seat, or, for the purpose of strengthening the radial tensioning, both seat 12 and seat 14 could be provided as conical seats.

Figure 3:
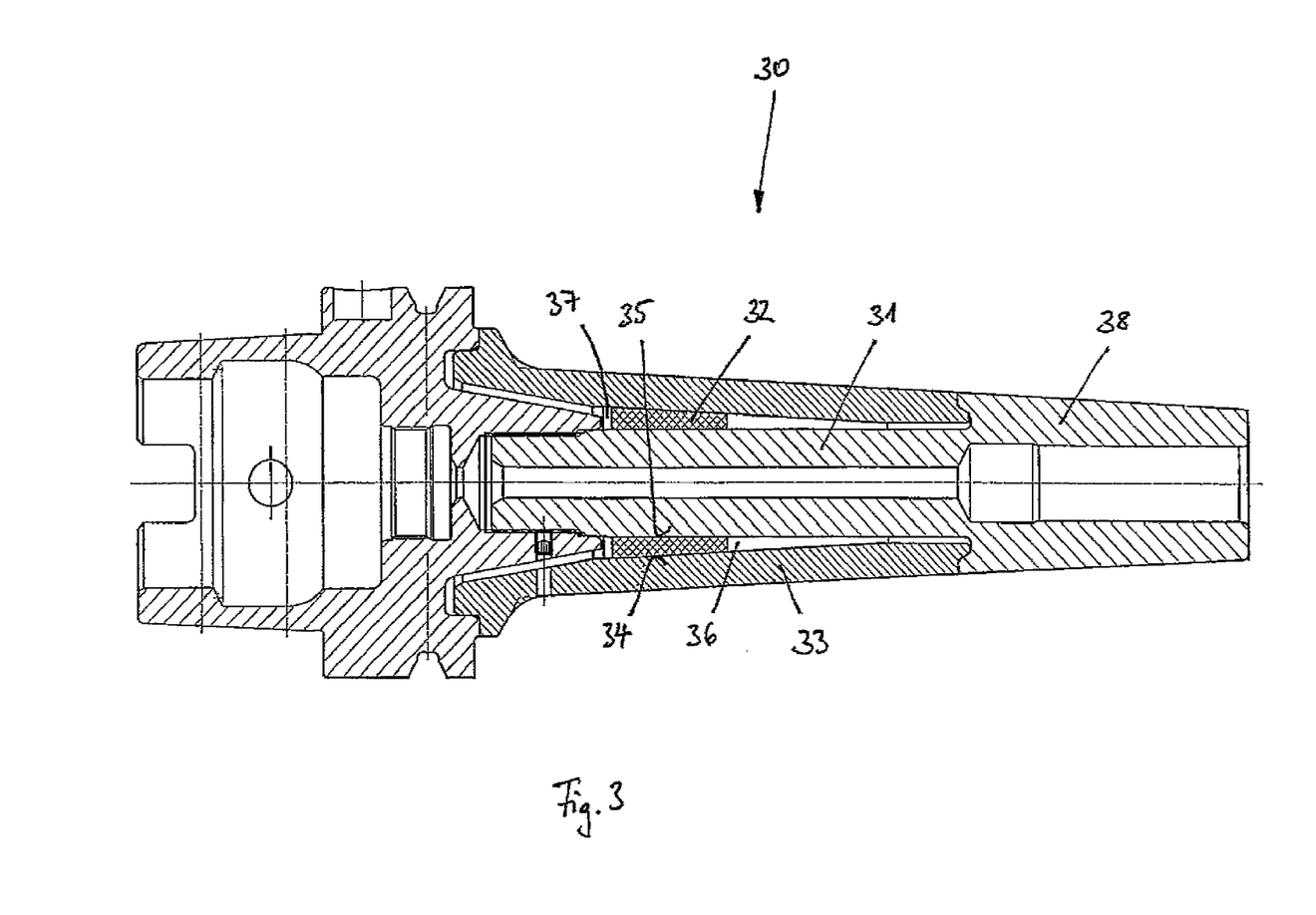

FIG. 3 shows an alternative design in tool holder 30, wherein the tool holder base body, in principle, corresponds to the tool holder base body of the tool holder 1. For this reason, design details of the other embodiments will henceforth be discussed only where they differ significantly from those of tool holder 1. In tool holder 30, the chuck 31 does not have a groove for accommodating the damping element 32 and the tensioning arrangement 33 has a wall section 34 which is not parallel to the wall section 35 of the chuck 31, such that a wedge-shaped annular gap 36 forms in this region. Through the choice of geometry of the preferably also conical damping element 32, it can be selectively pretensioned, as a result of which its damping properties can be selectively adjusted.

Instead of the conical damping element 32, the annular gap 36 can also be completely filled with a damping fluid introduced under over-pressure or with damping plastic, such as a polymer.

In addition, means can be provided to selectively influence the damping properties of the damping element 32 or of such a damping fluid or damping plastic. In the case of a damping element 32, as shown in FIG. 3, these means could, for example, be formed by one or more shims, which fill the annular gap section 37 and as a result force the damping elements 32 in the annular gap 36 towards the chuck head 38 and thus alter its damping properties by compression.

Figure 4:
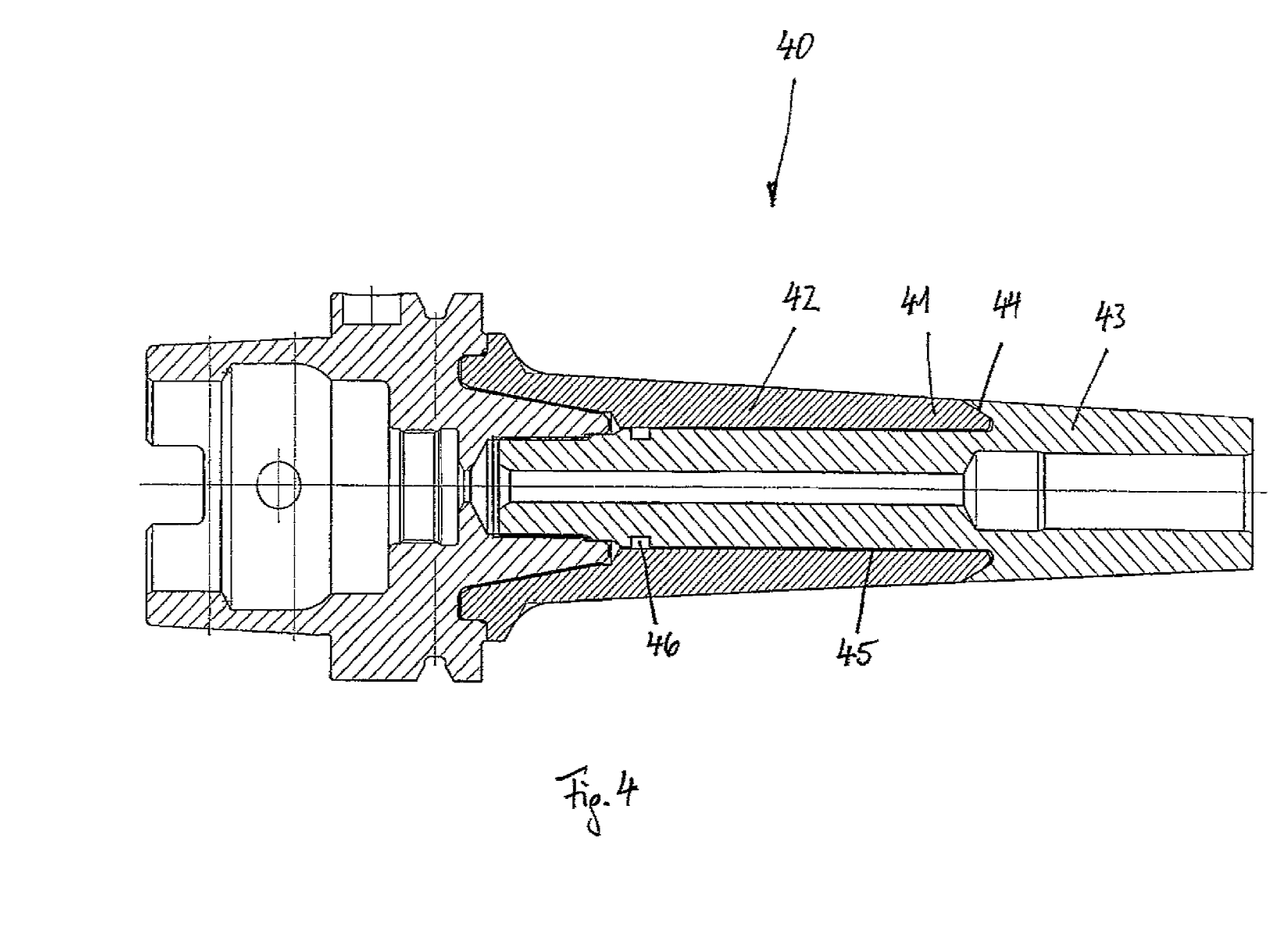

FIG. 4 shows another embodiment of the present invention. Tool holder 40 corresponds essentially to the tool holders 1 and 30, with the following differences. For one thing, there is no flat seat at the front end 41 between the tensioning arrangement 42 and the chuck head 43 of the tensioning arrangement 42, but rather only a conical seat 44 through which, at the same time, an axial and a radial tensioning of the tensioning arrangement 42 is generated with respect to the tool holder base body. This embodiment is of a particularly simple design. On the other hand, the annular gap 45 is much thinner, but this is quite sufficient, since there are only very slight differences in thermal expansion between the material of the tensioning arrangement 42 and the material of the tool holder base body. Accordingly, the damping element 46 can also have smaller dimensions.

Figure 5:
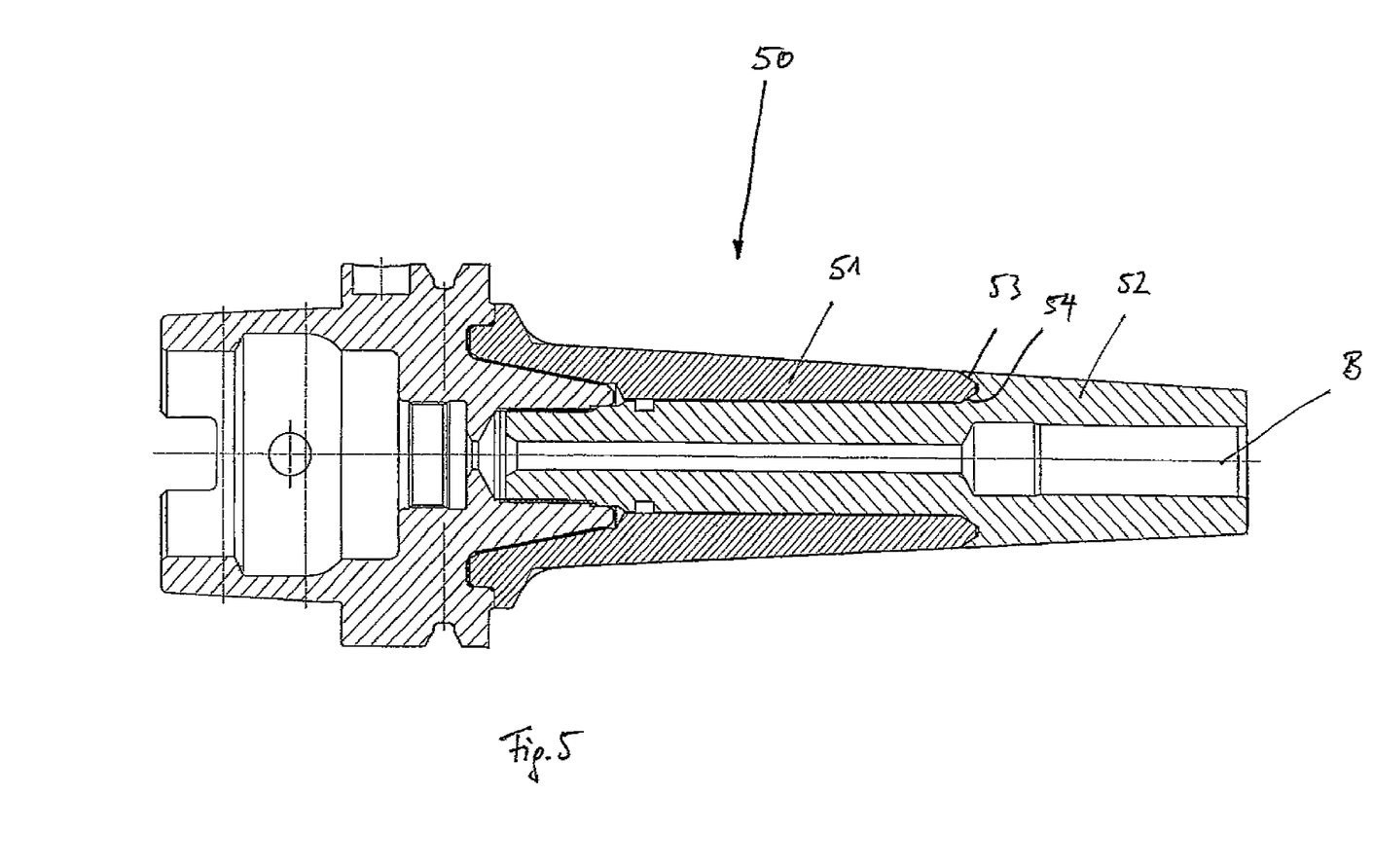

FIG. 5 shows a tool holder 50, which has essentially the same design as the tool holder 40 of FIG. 4, with two conical seats 53, 54 between the tensioning arrangement 51 and the chuck head 52, wherein the first conical seat 53 is formed by conical annular surfaces, which, with respect to the conical annular surfaces forming the conical seat 54, are arranged opposingly. This dual conical seat 53, 54 yields especially precise centring of the tensioning arrangement 51 with respect to the tool holder longitudinal axis B, said centring being very durable even in the event of thermal expansion.

Figure 6:
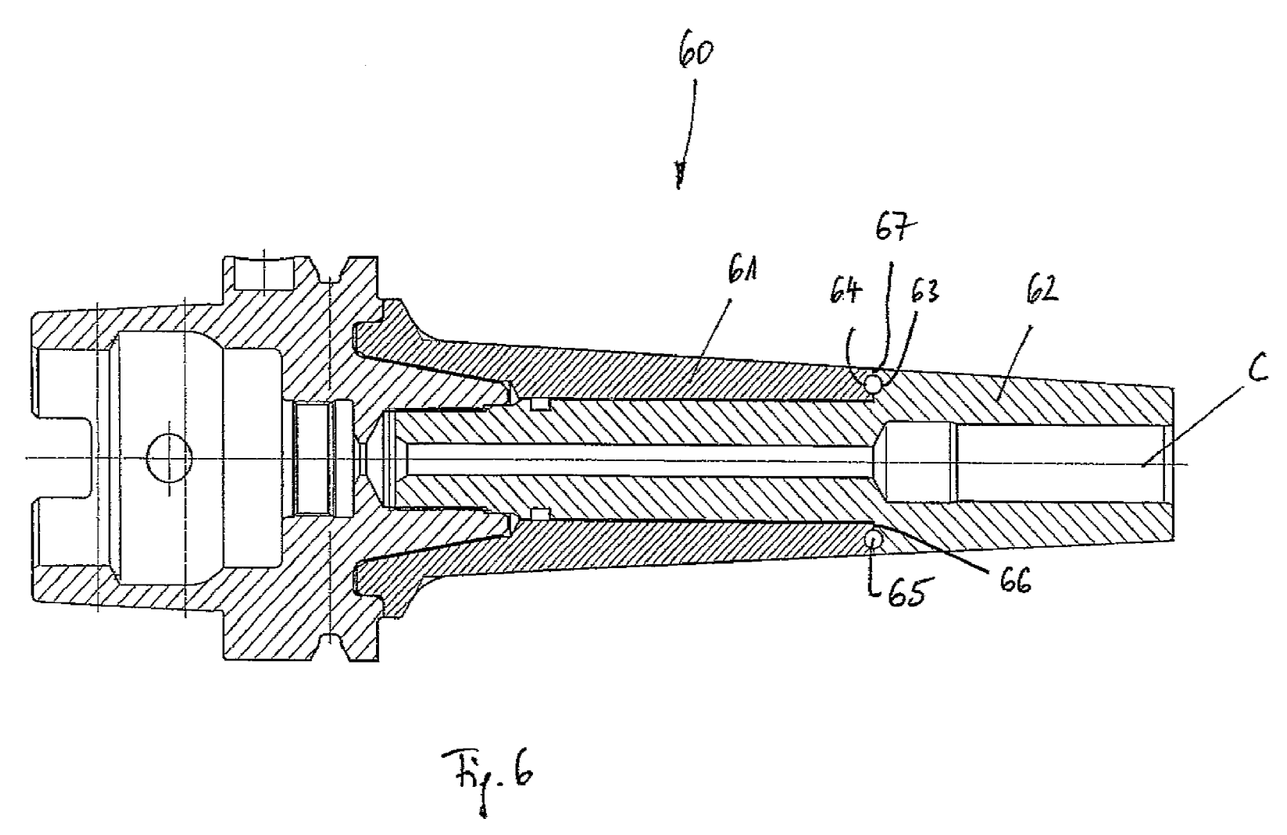

FIG. 6 and FIG. 9 show similar embodiments to FIG. 4 and FIG. 5, with only the abutting region between the tensioning arrangement and chuck head being of a different design.

In FIG. 6, both the tensioning arrangement 61 and the chuck head 62 have semi-circular annular grooves 63, 64 perpendicularly oriented to the tool holder longitudinal axis C and pointing towards each other, which are in positive lock with a centring mechanism 65, which can be designed as a continuous centring ring or in the form of individual balls. The abutting surfaces 66, 67 between the tensioning arrangement 61 and the chuck head 62 can be designed such that either a flat seat or a flat play results.

Figure 7:
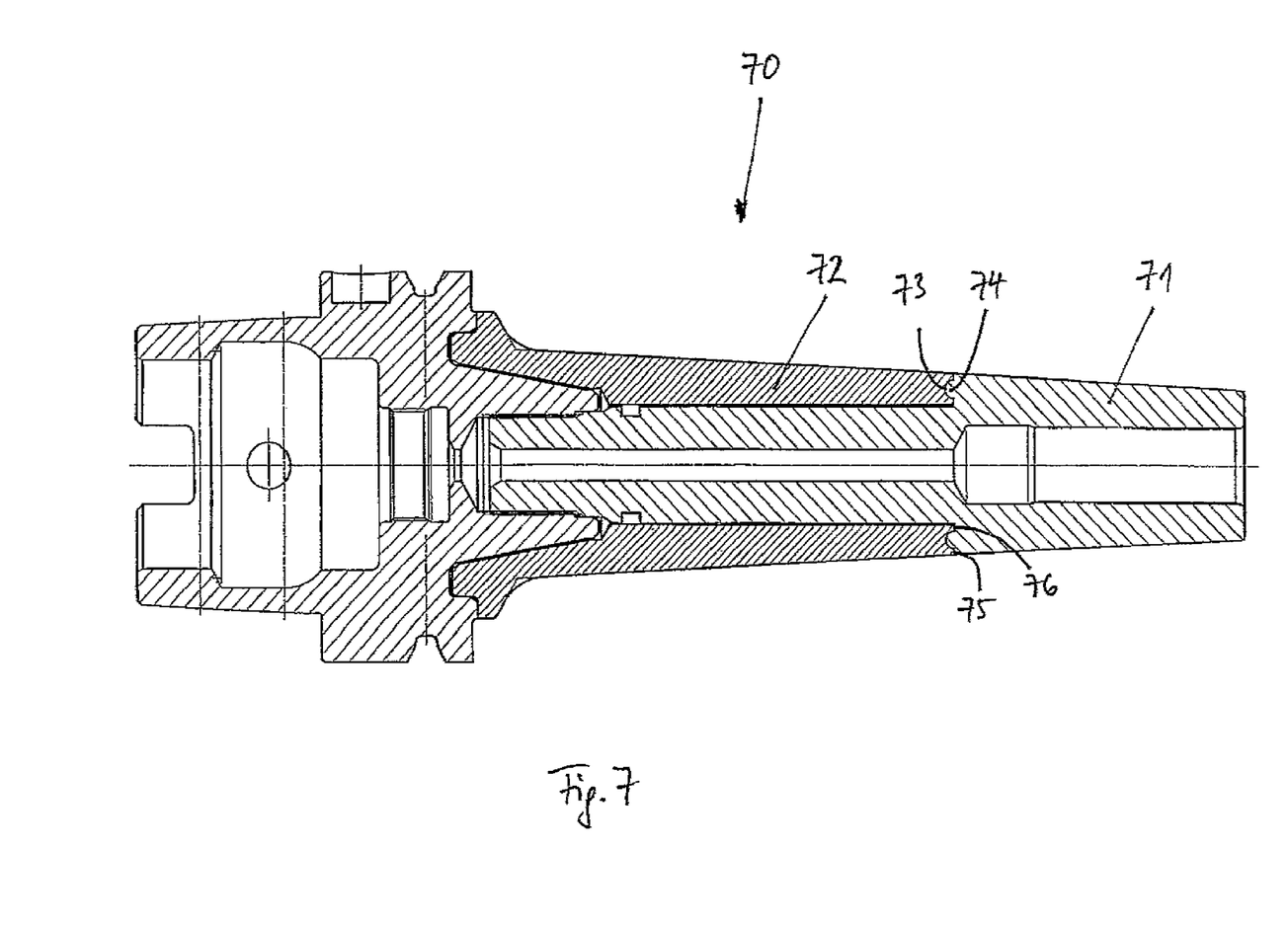

The abutting surface of tool holder 70 in FIG. 7 corresponds essentially to the abutting surface of tool holder 60, with the centring device 65 of the tool holder 60 being quasi accommodated in the chuck head 71 in the case of tool holder 70. Specifically, the tensioning arrangement 72, again, has a semicircular annular groove 73, into which a semi-circular annular bead 74 of the chuck head 71 forms a positive lock. Again, the abutting surfaces 75, 76 can have a flat seat or flat play design.

Figure 8:
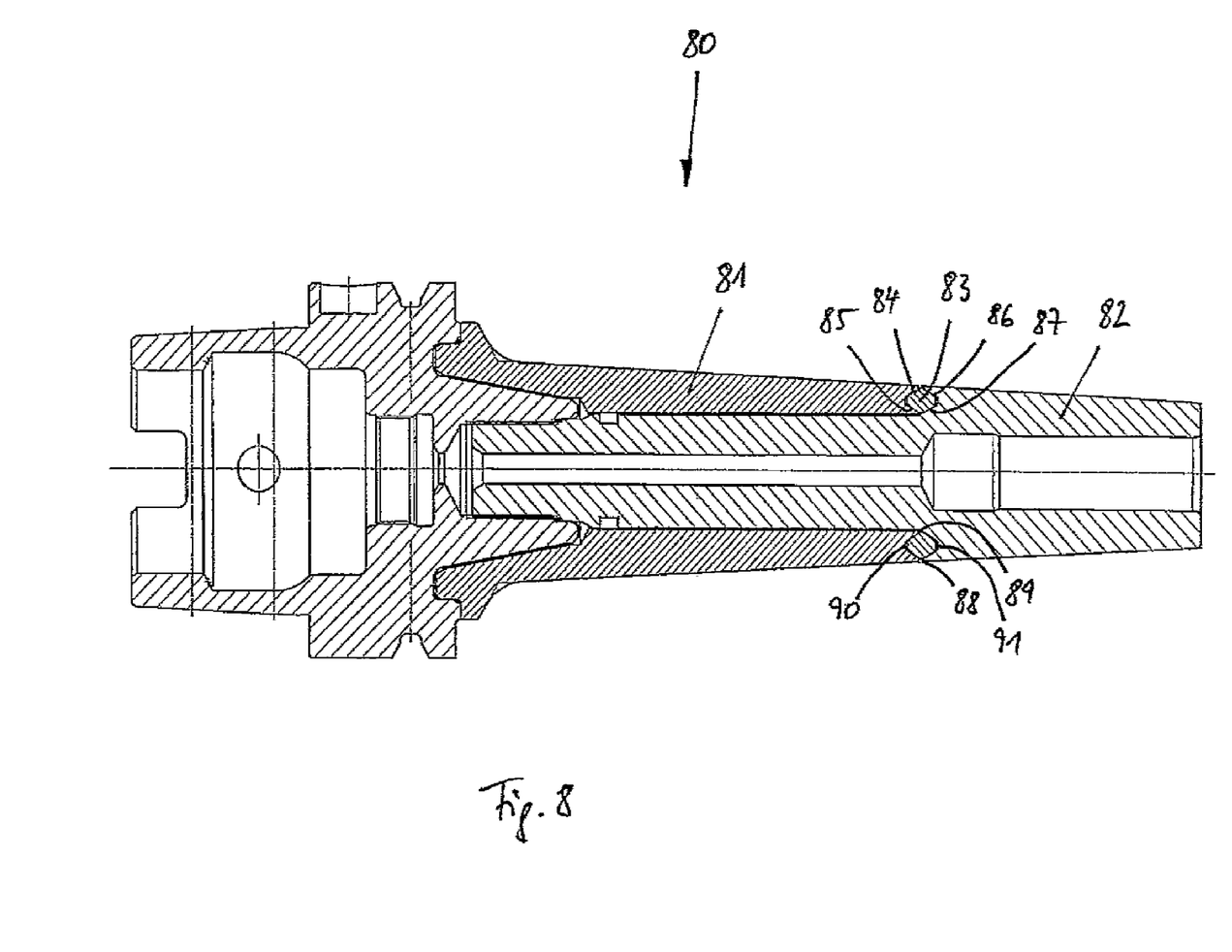

The abutting surface of the tool holder 80 shown in FIG. 8 has a diamond-shaped centring ring 83 between tensioning arrangement 81 and chuck head 82, said centring ring forming a positive lock with corresponding conical annular surfaces 84, 85, 86, 87 of tensioning arrangement 81 and the chuck head 82. Again, the abutting surfaces 88, 89 can have a flat seat or flat play design. Play is provided in the areas 90, 91 between tensioning arrangement 81 and centring ring 83 and between centring ring 83 and chuck head 82, said play being suitable for compensating for thermal expansion and preventing wedging of the centring ring 83 between the opposing conical annular surfaces 84, 85, 86, 87 of the tensioning arrangement 81 and chuck head 82.

Finally, the tool holder 100 shown in FIG. 9 has a centring ring 103 between the tensioning arrangement 101 and the chuck head 102, said ring providing a flat seat 104, 105 and additionally in each case a conical seat 106, 107, with respect to both the tensioning arrangement 101 and the chuck head 102.

FIG. 10 to FIG. 15 show various inventive tool holders, in some cases with mounted tools.

Figure 10:
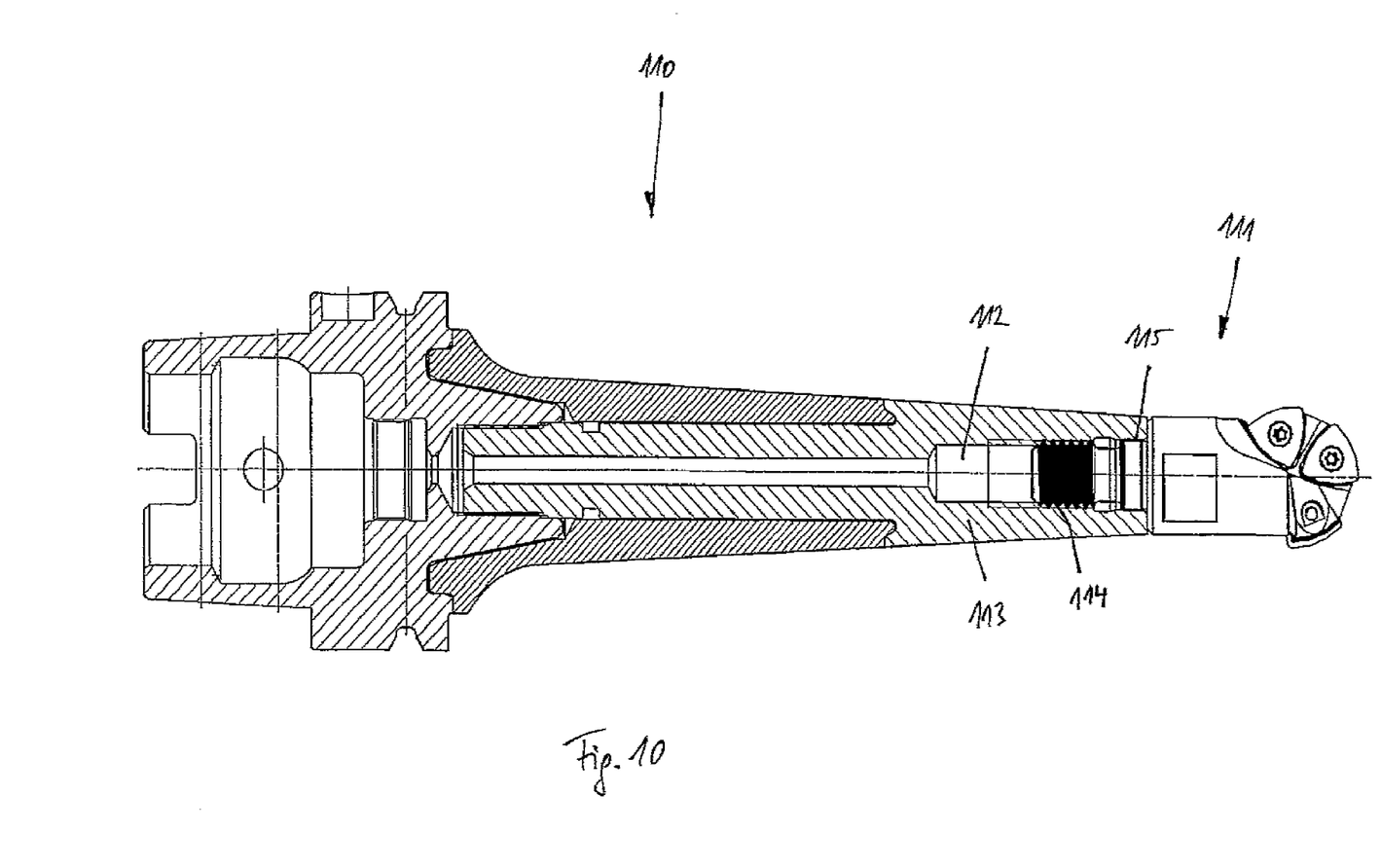

The tool holder 110 shown in FIG. 10 is holding a milling tool 111, which is immobilized by the tool receptacle 112 of the chuck head 113 via a screw connection 114 and has a cylindrical press fit 115 with respect to the chuck head 113.

Figure 11:
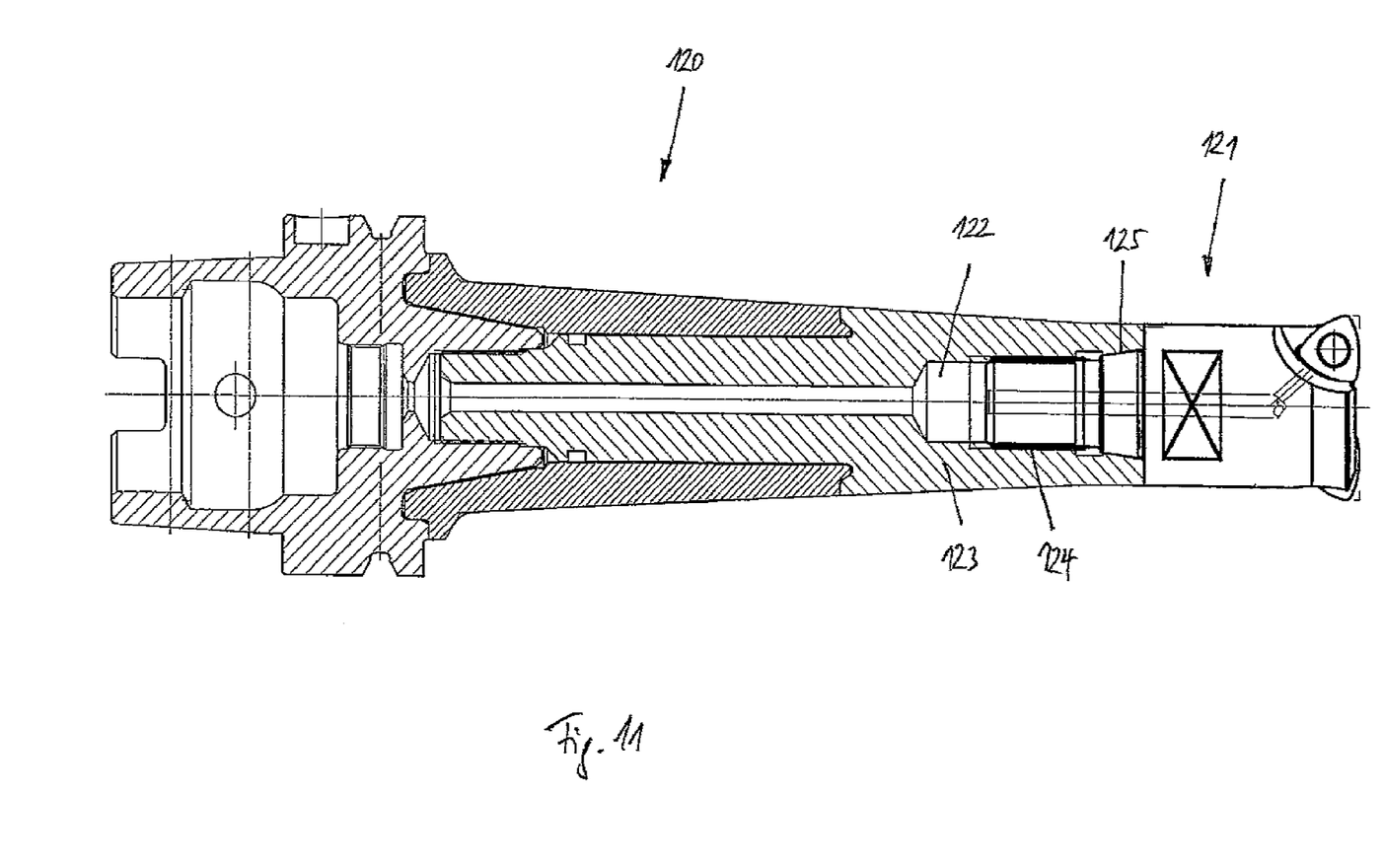

FIG. 11 shows a tool holder 120 in which a different design of milling tool 121 is immobilized in the tool receptacle 122 of the chuck head 123 via a screw connection 124. In this case, the milling tool 121 has a conical press fit 125 with respect to the chuck head 123.

Figure 12:
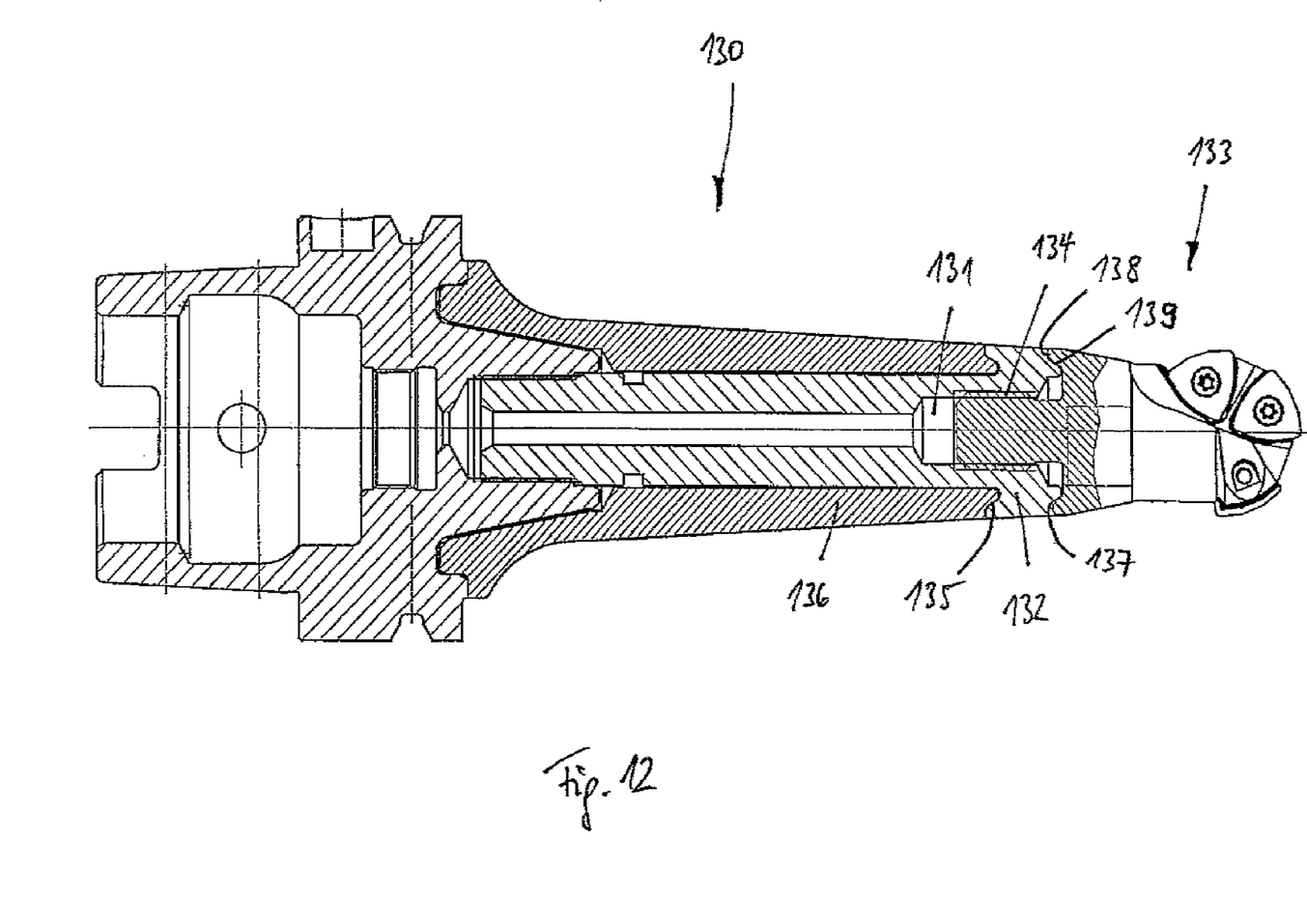

FIG. 12 shows a tool holder 130 in the chuck head 132 of whose tool receptacle 131*a* milling tool 133 is received and immobilized by a screw joint 134. Like the tensioning interface 135 between tensioning arrangement 136 and chuck head 132, there is also a tensioning interface 137 between chuck head 132 and milling tool 133, said interface having a flat seat 138 and a conical seat 139. To create different tensioning, the tensioning interface 137 can have either a concave or convex conical seat 139.

Figure 13:
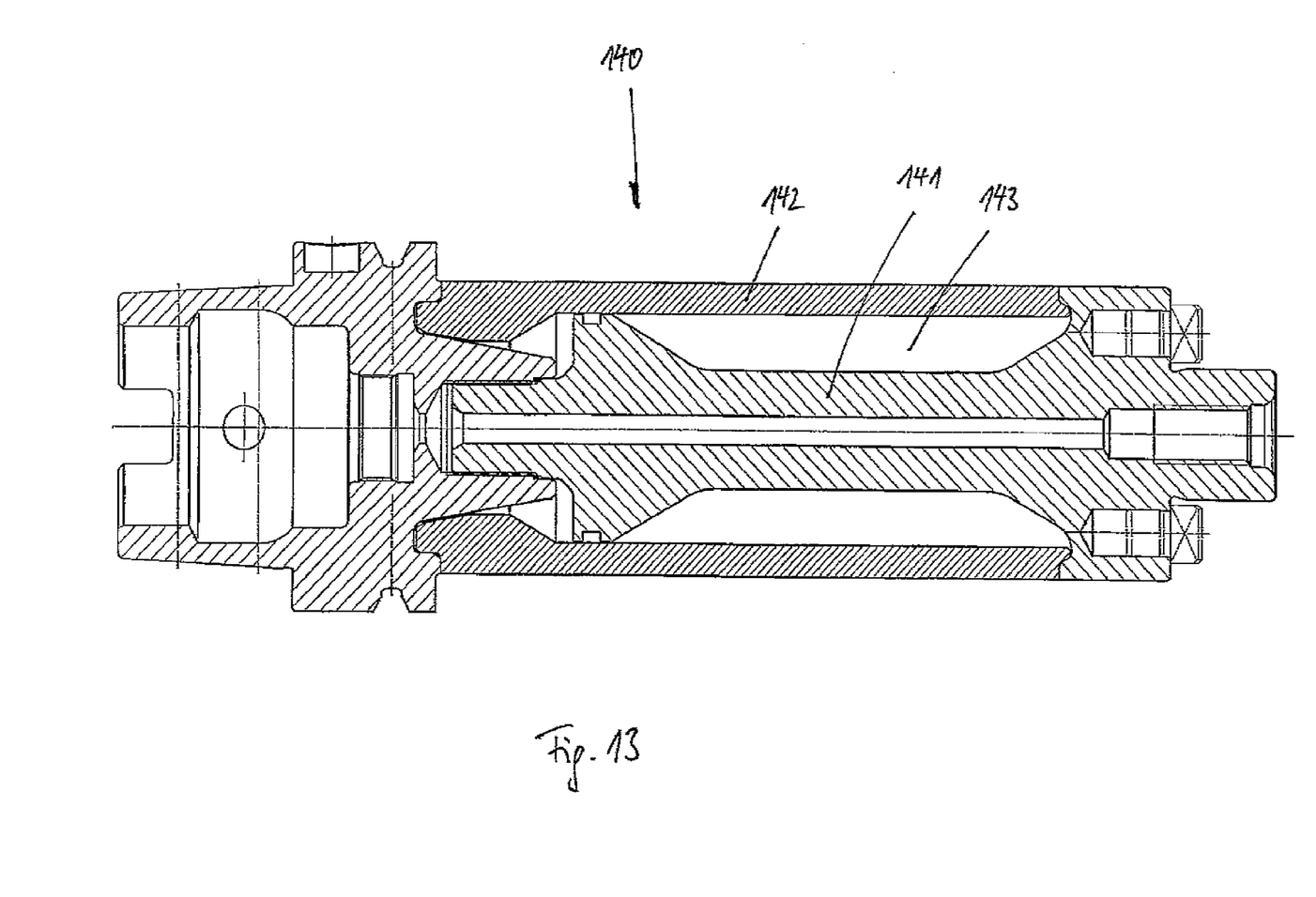

FIG. 13 shows a further embodiment of a tool holder 140, in which between chuck 141 and tensioning arrangement 142 is provided a relatively large annular gap 143, which forms a pressure chamber, which can be filled as necessary with a flowable or plastically deformable pressure medium. Tool holder 140 is suitable for receiving tools of all shapes and types, such as arbour head or arbour milling cutter.

Figure 14:
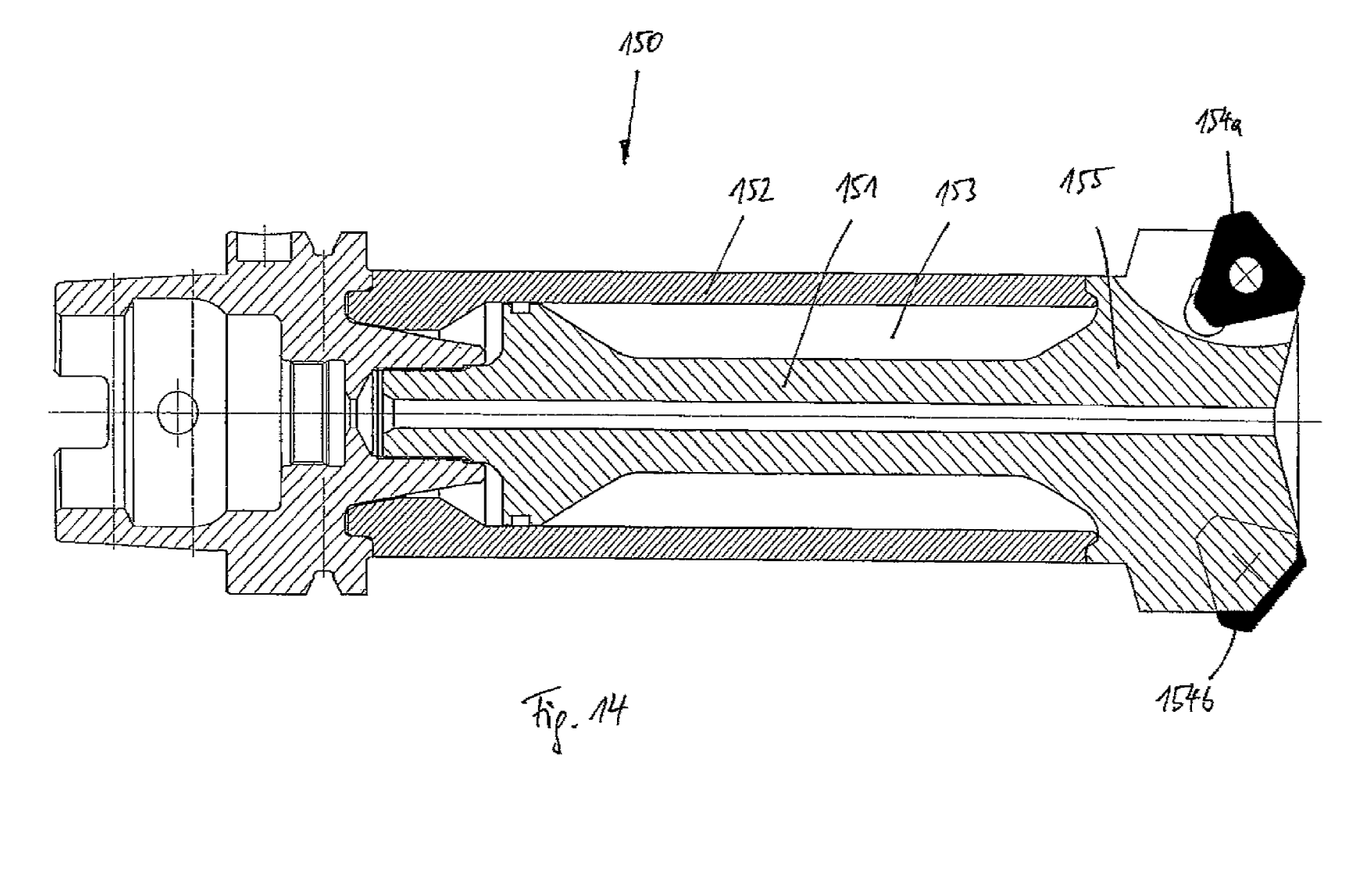

FIG. 14 shows a similar tool holder 150, which, like tool holder 140, has a relatively large annular gap 153 between chuck 151 and tensioning arrangement 152. Two interchangeable cutting tools 154a, 154b are immobilized rotationally symmetrically directly on the chuck head 155 of tool holder 150.

Figure 15:
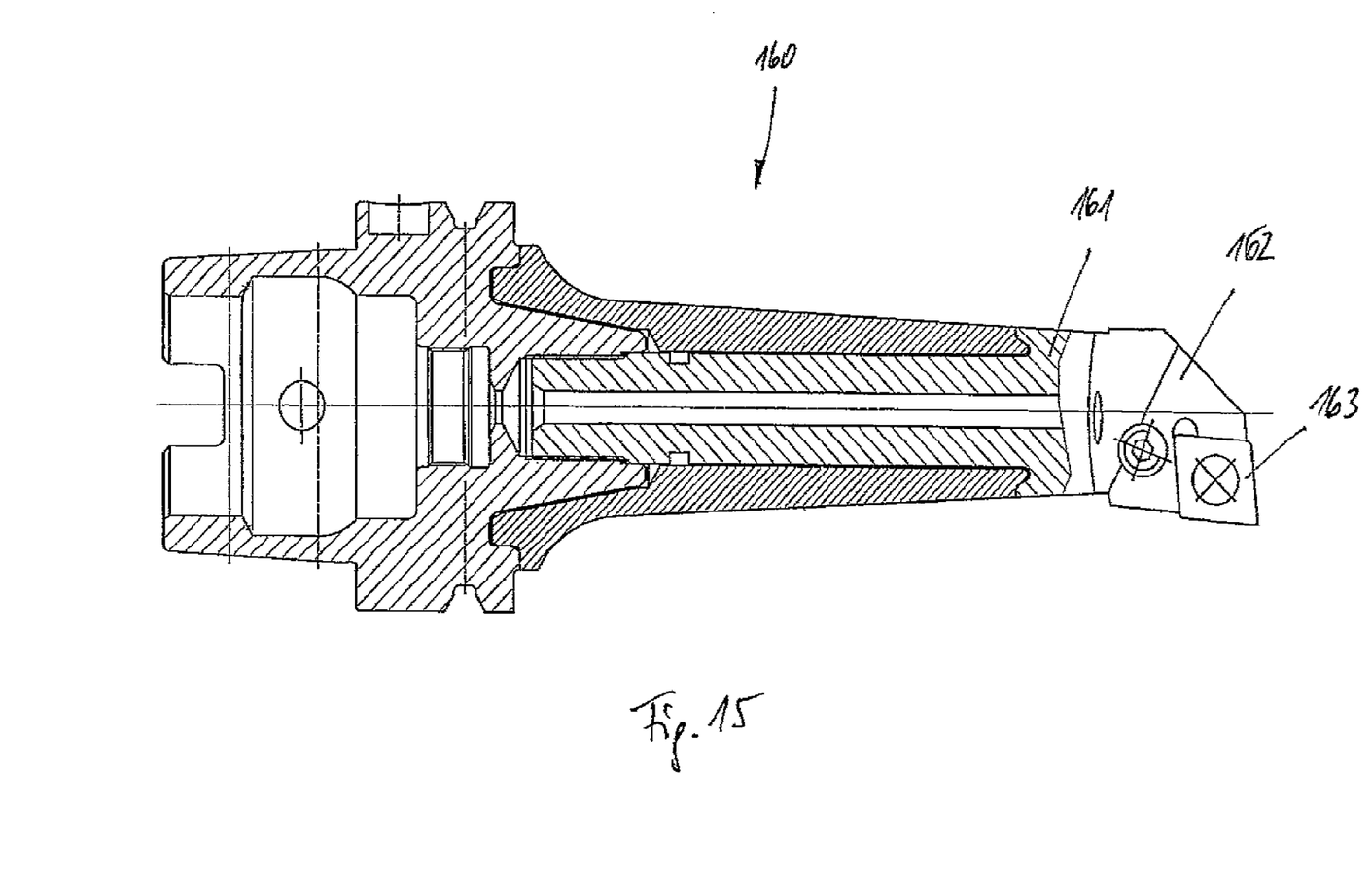

Finally, FIG. 15 shows a tool holder 160 with a rotary tool holder 162 attached directly to the chuck head 161 and a rotary tool 163 is arranged at the rotary tool holder 162.

From the foregoing, it has become clear that an inventive tool holder 1,30,40,50,60,70,80100,110,120,140,150,160 not only is significantly less susceptible to vibration than known tool holders, but also guarantees much better true-running in operation and especially in the case of thermally induced material expansion, since the tensioning arrangement 5,33,42,51,61,71,81,101,136,142,152 integrated in the tool holder 1,30,40,50,60,70,80,100,110,120,140,150,160 is continuously centered with respect to the tool holder base body. Moreover, it has become clear that such a tool holder 1,30,40,50,60,70,80,100,110,120,140,150,160, especially in a modular design, can be adapted very flexibly to different tool types 111,121,133,154a,154b,163 and workpiece machining operations.

The invention claimed is:

1. A tool holder comprising:
 a tool holder base body comprising
  a shaft configured to couple the tool holder to a tooling machine,
  a chuck including a receptacle to receive and immobilize a tool against rotation, and
  a middle section positioned between the shaft and the chuck, the middle section including a tensioning arrangement which, at least during operation of the tool holder, exerts a tensioning force on the tool holder base body in at least an axial direction,
 wherein at least one end of the tensioning arrangement includes one or more bearing surface sections, which contact one or more mating surface sections of the tool holder base body to produce a tensioning force having a radial component,
 wherein the one or more bearing surface sections make slidable contact with the one or more mating surface sections.

2. The tool holder in accordance with claim 1, wherein the one end of the tensioning arrangement is a front end and the tensioning arrangement includes a rear end and wherein the tensioning arrangement produces a tensioning force having a radial component at the front end and the rear end.

3. The tool holder in accordance with claim 1, wherein the tensioning arrangement is biased radially inwards with respect to the tool holder base body.

4. The tool holder in accordance with claim 1, wherein the tool holder has a modular design and the tensioning arrangement is a separate, removable component.

5. The tool holder in accordance with claim 4, wherein the chuck is detachable from the middle section and the shaft.

6. The tool holder in accordance with claim 4, wherein the chuck includes a detachable chuck head.

7. The tool holder in accordance with claim 1 wherein the one or more bearing surface sections has the shape of a conical annular surface and the tensioning arrangement at least partially axially engages the tool holder base body.

8. The tool holder in accordance with claim 1, wherein the one or more bearing surface sections has the shape of a semi-circular annular groove and the mating surface section is formed by a semi-circular annular projection or is provided by balls arranged individually in the tool holder base body.

9. The tool holder in accordance with claim 1, wherein the one or more mating surface sections is provided by a centring ring, which itself is received in the tool holder base body.

10. The tool holder in accordance with claim 9, wherein the centring ring has a circular cross-section and the one or more bearing surface sections has the shape of a semi-circular annular groove.

11. The tool holder in accordance with claim 9, wherein the centring ring has a diamond-like cross-section and the tensioning arrangement comprises two conically opposing annular bearing surfaces.

12. The tool holder in accordance with claim 1, wherein between the tensioning arrangement and the tool holder base body there is at least one flat seat, which is formed orthogonally, relative to the longitudinal axis of the tool holder, by flat abutting surfaces of the tensioning arrangement and the tool holder base body.

13. The tool holder in accordance with claim 1, wherein play exists at least between two opposing surfaces of the tensioning arrangement and the tool holder base body, with the exception of those areas in which the tensioning arrangement is axially or radially tensioned against the tool holder base body.

14. The tool holder in accordance with claim 1, wherein between the tensioning arrangement and the tool holder base body is arranged one or more damping elements for damping axial and/or radial vibration.

15. The tool holder in accordance with claim 14, wherein the one or more damping elements are arranged in and completely fill an annular gap.

16. The tool holder in accordance with claim 15, wherein the damping elements includes a damping fluid and/or damping plastic.

17. The tool holder in accordance with claim 14, the tool holder comprising shims that set the damping properties of the damping elements.

18. The tool holder in accordance with claim 1, wherein the chuck is an expansion or shrink fit chuck.

* * * * *